(12) United States Patent
Tomanovic et al.

(10) Patent No.: US 11,609,543 B2
(45) Date of Patent: Mar. 21, 2023

(54) SAFETY NETWORK CONTROLLER REDUNDANCY IN AN ELECTRONIC SAFETY SYSTEM

(71) Applicant: Ring Bus Americas LLC, Ann Arbor, MI (US)

(72) Inventors: Uros Tomanovic, Belgrade (RS); Dejan Teofilovic, Ann Arbor, MI (US)

(73) Assignee: RING BUS AMERICAS LLC, Ann Arbor, MI (US)

( * ) Notice: Subject to any disclaimer, the term of this patent is extended or adjusted under 35 U.S.C. 154(b) by 351 days.

(21) Appl. No.: 17/076,199

(22) Filed: Oct. 21, 2020

(65) Prior Publication Data

US 2022/0121166 A1    Apr. 21, 2022

(51) Int. Cl.
  *G05B 19/042*    (2006.01)
  *G05B 19/05*    (2006.01)
  *H04L 1/22*    (2006.01)

(52) U.S. Cl.
  CPC ....... *G05B 19/0428* (2013.01); *G05B 19/052* (2013.01); *H04L 1/22* (2013.01)

(58) Field of Classification Search
  CPC .. G05B 19/00; G05B 19/048; G05B 19/0428; G05B 19/052; H04L 1/22
  See application file for complete search history.

(56) References Cited

U.S. PATENT DOCUMENTS

| | | | | |
|---|---|---|---|---|
| 2009/0222112 A1* | 9/2009 | Moddemann | ..... | H04L 12/40006 700/79 |
| 2010/0145475 A1* | 6/2010 | Bartels | ................... | G05B 15/02 700/79 |
| 2016/0139999 A1* | 5/2016 | Gabler | .................... | H04L 45/28 714/4.11 |
| 2019/0302730 A1* | 10/2019 | Ueda | .................. | G05B 19/0425 |
| 2020/0133243 A1* | 4/2020 | Scheible | ............ | G05B 19/4184 |
| 2022/0050451 A1* | 2/2022 | Stay | ................. | G05B 19/41835 |

FOREIGN PATENT DOCUMENTS

| | | | | | |
|---|---|---|---|---|---|
| EP | 2149830 | A1 * | 2/2010 | ......... | G05B 19/4063 |
| EP | 3547049 | A1 * | 10/2019 | ......... | G05B 19/0423 |
| EP | 3599521 | A1 * | 1/2020 | ......... | G05B 19/0423 |
| JP | 2011090675 | A * | 5/2011 | ......... | G05B 19/0426 |
| JP | WO 2022239116 | A1 * | 11/2022 | ........... | G05B 19/048 |
| WO | WO-9322151 | A1 * | 11/1993 | ................ | B60L 3/12 |
| WO | WO-2018139627 | A1 * | 8/2018 | ........... | G05B 19/058 |

* cited by examiner

*Primary Examiner* — Ronald D Hartman, Jr.
(74) *Attorney, Agent, or Firm* — Coats & Bennett, PLLC

(57) ABSTRACT

A safety network controller is comprised in an electronic safety system. The safety network controller comprises a first serial port and a second serial port, each of which is configured to communicatively connect to a redundant safety network controller via a respective daisy chain network. Each daisy chain network comprises at least one safety device controller that is controlling a corresponding safety device. The safety network controller further comprises network circuitry configured to communicatively connect to the redundant safety network controller via a packet-switched network. The safety network controller further comprises processing circuitry configured to exchange, with the redundant safety network controller: serial communication via each of the daisy chain networks; packets via the packet-switched network; and responsibility for control over one or more of the safety device controllers in response to detecting a failure.

30 Claims, 14 Drawing Sheets

SAFETY NETWORK CONTROLLER REDUNDANCY IN AN ELECTRONIC SAFETY SYSTEM

BACKGROUND

Electronic safety systems are often relied upon to help protect people and/or property from hazards at a given location. Common hazards may include, for example, fire, flooding, smoke, gas, radioactivity, and the like. Hazards may additionally or alternatively be related to extreme environmental conditions, such as conditions produced by earthquakes, tornados, hurricanes, extreme thunderstorms, lightning strikes, solar flares, and monsoons. Yet other hazards may have human or mechanical causes, such as terrorist attacks, riots, robberies, equipment malfunctions, power failures, structural collapses, and so on.

BRIEF SUMMARY

While hazards can be quite dangerous and destructive, they can also be quite rare. Ideally, highly complex safety systems would be pervasive and effective at providing protections against any type of hazard one might possibly encounter. In practice, implementation of safety systems must often be practical with respect to the environment in which they are installed and the likelihood that certain hazardous events will take place. Accordingly, trade-offs between system complexity, coverage, cost, risk, and other factors are often required.

In view of the above, embodiments of the present disclosure are generally directed to electronic safety systems that offer redundancy of communication between networked controllers that can be flexibly adapted to accommodate a wide variety of the aforementioned practical concerns.

Particular embodiments are directed to a safety network controller in an electronic safety system. The safety network controller comprises a first serial port and a second serial port, each of which is configured to communicatively connect to a redundant safety network controller via a respective daisy chain network. Each daisy chain network comprising at least one safety device controller that is configured to control a corresponding safety device. The safety network controller further comprises network circuitry configured to communicatively connect to the redundant safety network controller via a packet-switched network. The safety network controller further comprises processing circuitry communicatively connected to the network circuitry and each of the serial ports. The processing circuitry is configured to exchange, with the redundant safety network controller: serial communication via each of the daisy chain networks; packets via the packet-switched network; and responsibility for control over one or more of the safety device controllers in response to detecting a failure.

In some embodiments, to connect to the redundant safety network controller via the packet-switched network, the network circuitry is configured to communicatively connect to the redundant safety network controller via a plurality of packet-switched paths having initial hops at respective external network switches. In some such embodiments, the network circuitry is further configured to communicatively connect to each of a pair of further safety network controllers via at least two of the external network switches, and the further safety network controllers are redundant to each other. Additionally or alternatively, in some embodiments, the network circuitry comprises an internal network switch via which the network circuitry is configured to communicatively connect to the redundant safety network controller via the plurality of packet-switched paths. Additionally or alternatively, in some embodiments, the processing circuitry is further configured to exchange status information with a remote safety administration terminal via at least two of the external network switches.

In some embodiments, to exchange responsibility for control over one or more of the safety device controllers in response to detecting the failure, the processing circuitry is configured to respond to detecting the failure in the redundant safety network controller by taking control over all of the safety device controllers on the daisy chain networks controlled by the redundant safety network controller.

In some embodiments, to exchange responsibility for control over one or more of the safety device controllers in response to detecting the failure, the processing circuitry is configured to respond to detecting the failure in the safety network controller by surrendering control over all of the safety device controllers on the daisy chain networks controlled by the safety network controller to the redundant safety network controller.

In some embodiments, to exchange responsibility for control over one or more of the safety device controllers in response to detecting the failure, the processing circuitry is configured to respond to detecting the failure in one of the daisy chain networks by surrendering control over a safety device controller at a point on the daisy chain network beyond the failure to the redundant safety network controller.

In some embodiments, to exchange responsibility for control over one or more of the safety device controllers in response to detecting the failure, the processing circuitry is configured to respond to detecting the failure in one of the daisy chain networks by taking control over a safety device controller at a point on the daisy chain network before the failure from the redundant safety network controller.

In some embodiments, the processing circuitry is further configured to discover each of the safety device controllers of each daisy chain network. To discover each of the safety device controllers of each daisy chain network, the processing circuitry is configured to, for each daisy chain network, transmit identification requests on the daisy chain network until the processing circuitry fails to receive a corresponding response comprising a safety device identifier.

In some embodiments, the processing circuitry is further configured to divide responsibility for controlling the safety device controllers of each daisy chain network between the safety network controller and the redundant safety network controller such that each controls at least one safety device controller per daisy chain network.

In some embodiments, the first and second serial ports are further configured to relay power to respective safety devices on the respective daisy chain networks.

In some embodiments, the first and second serial ports are communicatively connected to each other and are configured to form, from at least the daisy chain networks, a ring network that includes the safety network controller, the redundant safety network controller, and the safety device controllers of each of the daisy chain networks.

In some embodiments, the safety network controller further comprises one or more further serial ports each of which is configured to communicatively connect to, and exchange further serial communication over, a respective further daisy chain network comprising at least one further safety device controller that is controlling a corresponding further safety device.

In some embodiments, one of the daisy chain networks comprises a direct connection between a first safety device controller and a second safety device controller, and the processing circuitry is further configured to command the first safety device controller to check the direct connection by measuring impedance over the direction connection between the first and second safety device controllers.

Other embodiments are directed to a method of supporting control redundancy within an electronic safety system, implemented by a safety network controller. The method comprises exchanging serial communication with a redundant safety network controller via a first serial port and a second serial port, each serial port being communicatively connected to the redundant safety network controller via a respective daisy chain network, each daisy chain network comprising at least one safety device controller that is configured to control a corresponding safety device. The method further comprises exchanging packets with the redundant safety network controller via a packet-switched network. The method further comprises exchanging, with the redundant safety network controller, responsibility for control over one or more of the safety device controllers in response to detecting a failure.

In some embodiments, exchanging packets with the redundant safety network controller via the packet-switched network comprises exchanging the packets via a plurality of packet-switched paths having initial hops at respective external network switches. In some such embodiments, the method further comprises exchanging further packets via the packet-switched network with each of a pair of further safety network controllers via at least two of the external network switches, wherein the further safety network controllers are redundant to each other. Additionally or alternatively, in some embodiments, exchanging the packets via the plurality of packet-switched paths having initial hops at respective external network switches comprises exchanging the packets via an internal network switch of the safety network controller. Additionally or alternatively, in some embodiments the method further comprises exchanging status information with a remote safety administration terminal via at least two of the external network switches.

In some embodiments, exchanging, with the redundant safety network controller, responsibility for control over one or more of the safety device controllers in response to detecting the failure comprises responding to detecting the failure in the redundant safety network controller by taking control over all of the safety device controllers on the daisy chain networks controlled by the redundant safety network controller.

In some embodiments, exchanging, with the redundant safety network controller, responsibility for control over one or more of the safety device controllers in response to detecting the failure comprises responding to detecting the failure in the safety network controller by surrendering control over all of the safety device controllers on the daisy chain networks controlled by the safety network controller to the redundant safety network controller.

In some embodiments, exchanging, with the redundant safety network controller, responsibility for control over one or more of the safety device controllers in response to detecting the failure comprises responding to detecting the failure in one of the daisy chain networks by surrendering control over a safety device controller at a point on the daisy chain network beyond the failure to the redundant safety network controller.

In some embodiments, exchanging, with the redundant safety network controller, responsibility for control over one or more of the safety device controllers in response to detecting the failure comprises responding to detecting the failure in one of the daisy chain networks by taking control over a safety device controller at a point on the daisy chain network before the failure from the redundant safety network controller.

In some embodiments, the method further comprises discovering each of the safety device controllers of each daisy chain network, the discovering comprising, for each daisy chain network, transmitting identification requests on the daisy chain network until failing to receive a corresponding response comprising a safety device identifier.

In some embodiments, the method further comprises dividing responsibility for controlling the safety device controllers of each daisy chain network between the safety network controller and the redundant safety network controller such that each controls at least one safety device controller per daisy chain network.

In some embodiments, the method further comprises relaying power to respective safety devices on the respective daisy chain networks via the first and second serial ports.

In some embodiments, the method further comprises bridging the first and second serial ports to form, from at least the daisy chain networks, a ring bus that includes the safety network controller, the redundant safety network controller, and the safety device controllers of each of the daisy chain networks.

In some embodiments, the method further comprises exchanging further serial communication with at least one further safety device controller that is controlling a corresponding further safety device via one or more further serial ports connected to respective further daisy chain networks.

In some embodiments, one of the daisy chain networks comprises a direct connection between a first safety device controller and a second safety device controller, and the method further comprises commanding the first safety device controller to check the direct connection by measuring impedance over the direction connection between the first and second safety device controllers.

Other embodiments include the safety network controller configured to perform any of the methods described above.

Yet other embodiments include a non-transitory computer readable medium storing a computer program product for controlling a programmable safety network controller, the computer program product comprising software instructions that, when run on the programmable safety network controller, cause the programmable safety network controller to perform any of the methods described above.

Of course, the present examples are not limited to the above contexts or examples, and additional features and advantages will become apparent in view of the following detailed description and in view of the accompanying drawings.

BRIEF DESCRIPTION OF THE DRAWINGS

Aspects of the present disclosure are illustrated by way of example and are not limited by the accompanying figures with like references indicating like elements. In general, the use of a reference numeral should be regarded as referring to the depicted subject matter according to one or more embodiments, whereas discussion of a specific instance of an illustrated element will append a letter designation thereto (e.g., discussion of a safety network controller 100a, generally, as opposed to discussion of particular instances of safety network controllers 100a, 100b).

DETAILED DESCRIPTION

Embodiments of the present disclosure generally relate to safety network controller in an electronic safety system. As will be discussed below, the safety network controller supports control redundancy within the electronic safety system.

Figure 1:
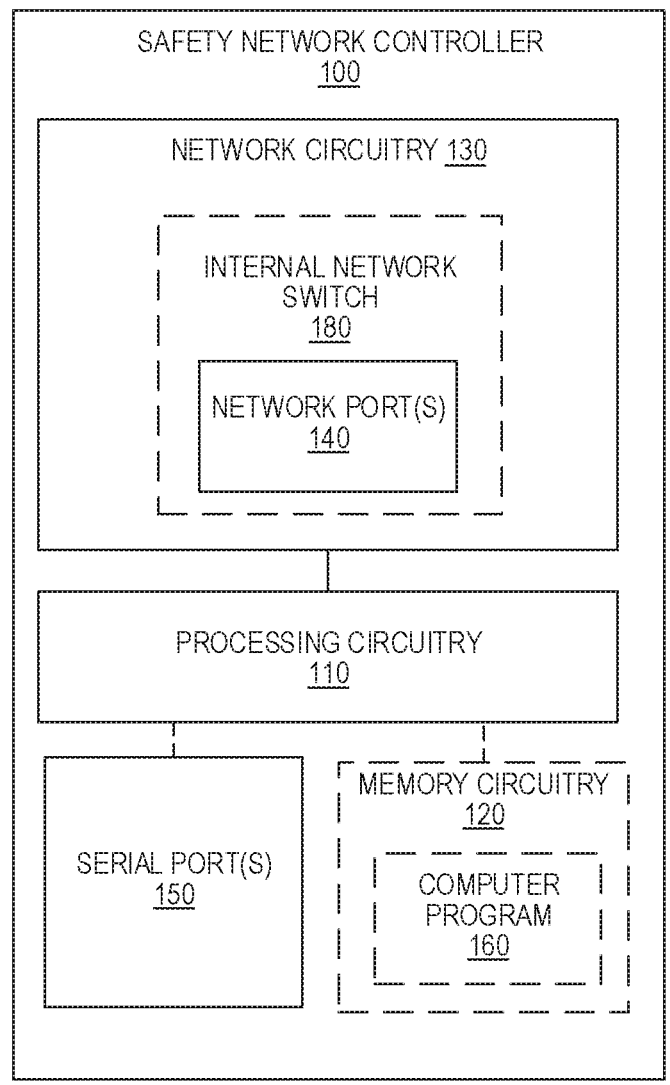
FIG. 1 is a schematic block diagram of an example safety network controller in accordance with various embodiments.

FIG. 1 is a schematic block diagram of an example safety network controller 110 in accordance with various embodiments. The safety network controller 110 comprises network circuitry 130, processing circuitry 110, and one or more serial ports 150. The processing circuitry 110 is communicatively connected to the serial port(s) 120 and the network circuitry 130. In one example, the safety network controller 100 may be a Ringbus Master Controller (sometimes referred to as an RBCPU).

In general, the safety network controller is configured to communicate with one or more other devices in the electronic safety system via the serial port(s) 150 and network circuitry 130 under the control of the processing circuitry 110. Additional detail regarding such communication will be described more fully below.

The processing circuitry 110 may comprise one or more microprocessors, microcontrollers, hardware circuits, discrete logic circuits, hardware registers, digital signal processors (DSPs), field-programmable gate arrays (FPGAs), application-specific integrated circuits (ASICs), or any combination thereof. For example, the processing circuitry 110 may be programmable hardware capable of executing software instructions stored, e.g., as a machine-readable computer program 160 in memory circuitry 120 of the safety network controller 100. The memory circuitry 120 of the various embodiments may comprise any non-transitory machine-readable media known in the art or that may be developed, whether volatile or non-volatile, including but not limited to solid state media (e.g., SRAM, DRAM, DDRAM, ROM, PROM, EPROM, flash memory, solid state drive, etc.), removable storage devices (e.g., Secure Digital (SD) card, miniSD card, microSD card, memory stick, thumb-drive, USB flash drive, ROM cartridge), fixed drive (e.g., magnetic hard disk drive), or the like, entirely or in any combination.

The network circuitry 130 may be a network controller configured to control the packet-switched input and output (I/O) data paths of the safety network controller 100. For example, the network circuitry 130 may comprise a transceiver configured to send and receive communication signals over Ethernet. Among other things, the network circuitry 130 provides the safety network controller 100 with an interface to one or more other devices in the electronic safety system via one or more network ports 140. In some embodiments, the network circuitry 130 comprises an internal network switch 180 configured to transmit particular packets to a selected one or more of the network ports 140 as may be desired or required, including (for example) unicast, multicast, and broadcast transmissions.

Figure 2:
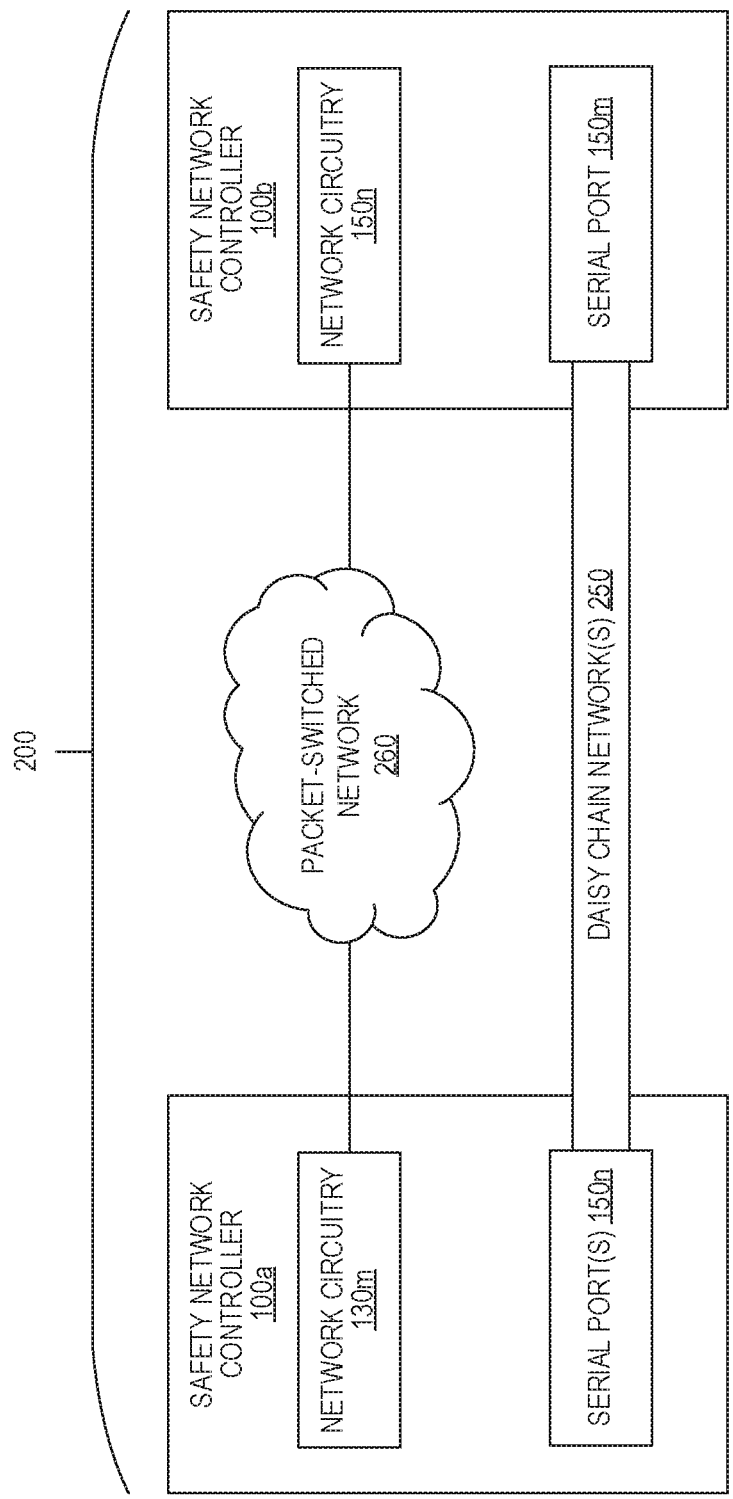
FIG. 2 is a schematic block diagram of an example electronic safety system, according to one or more embodiments of the present disclosure.

FIG. 2 is a schematic block diagram of an example electronic safety system 200. As shown in FIG. 2, the electronic safety system 200 comprises a first safety network controller 100a and a second safety network controller 100b. The serial port(s) 150n, 150m of the safety network controllers 100a, 100b, respectively, are communicatively connected to each other by one or more daisy chain network(s) 250. The network circuitry 130m, 130n of the safety network controllers 100a, 100b, respectively, are communicatively connected to each other by a packet-switched network 260. In one example, the electronic safety system 200 may be or include a Ringbus system.

Figure 3:
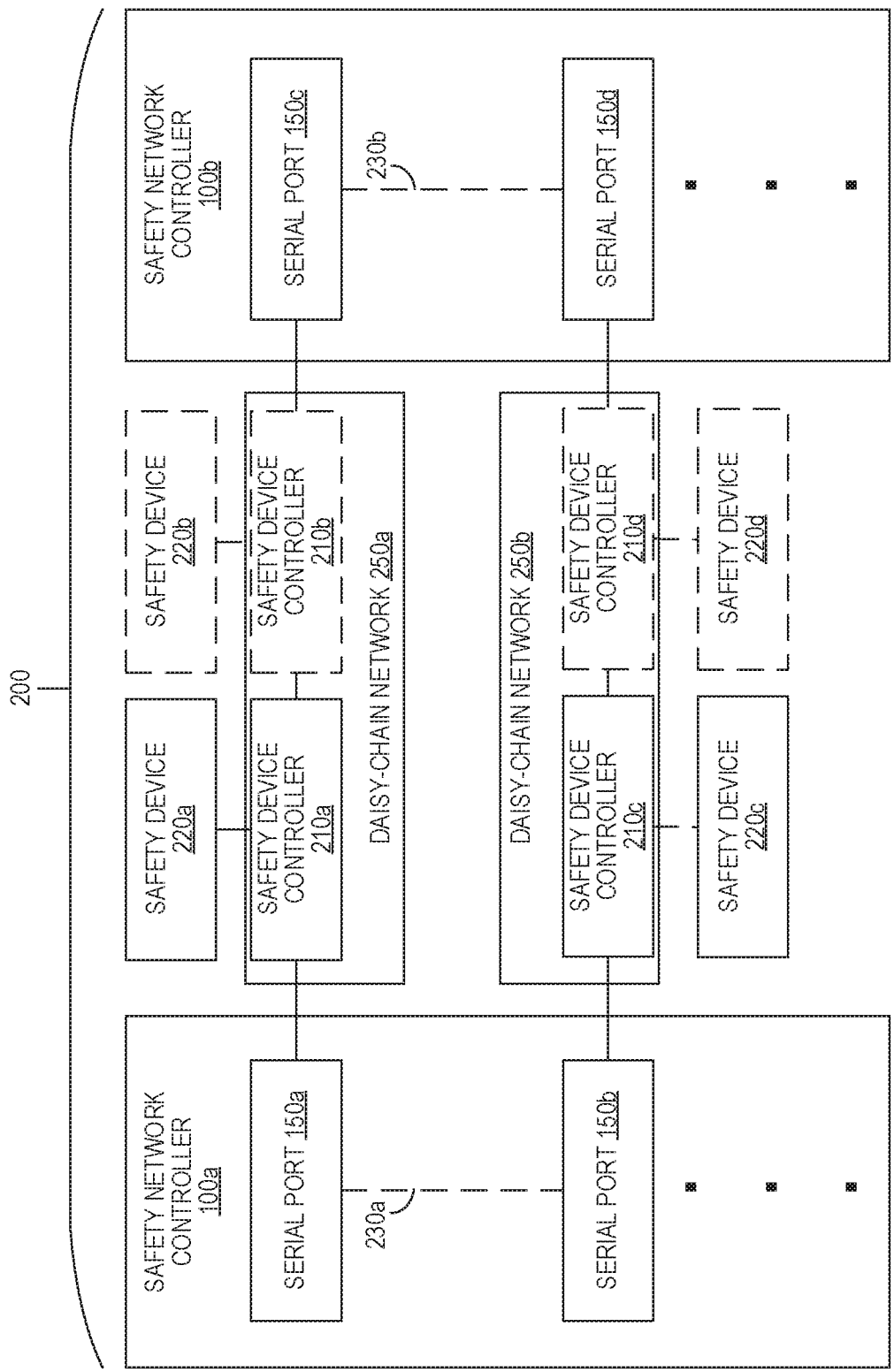
FIG. 3 is a schematic block diagram that illustrates an example of the serial interconnection between safety network controllers, according to one or more embodiments of the present disclosure.

FIG. 3 is a schematic block diagram that illustrates an example of the serial interconnection between safety network controllers 100a, 100b in greater detail. In the particular example of FIG. 3, each of the safety network controllers 100a, 100b comprises at least two serial ports 150a-b, 150c-d, respectively. Serial port 150a is configured to communicatively connect to serial port 150c of safety network controller 100b via daisy chain network 250a. Serial port 150b is configured to communicatively connect to serial port 150d of safety network controller 100b via daisy chain network 250b.

Each of the daisy chain networks 250a, 250b comprises each of the safety network controllers 100a, 100b. Each of the daisy chain networks 250a, 250b further comprises at least one safety device controller 210a, 210c (respectively) that is configured to control a corresponding safety device 220a, 220c. Thus, in some embodiments, one or more of the daisy chain networks 250a, 250b may comprise one or more further safety device controllers 210b, 210d that are configured to controller corresponding safety devices 220b, 220d. Although not shown, other embodiments may include one or more additional or alternative daisy chain networks 250 that also include one or more other devices and/or safety network controllers 100.

An example of a safety device controller 210 is a Ringbus Field Unit (RBFU). The safety devices 220a-d are communicatively coupled to the safety device controllers 210a-d (e.g., by a dedicated cabled connection or other point-to-point connection), but are not on the daisy chain networks 250a, 250b. Examples of safety devices 220 include devices for detecting, suppressing, and/or alerting people to the actual or possible existence of hazards, including (but not limited to) fire, smoke, gas, dangerous weather, flooding, disasters, seismic activity, criminal acts, terrorism, and the like. As one particular example, a safety device controller 210 may be configured to detect a fire, control a corresponding safety device 220 to actuate a fire suppression mechanism, and notify one or more safety network controllers 100 that a safety measure of the electronic safety system 200 has been triggered.

As will be discussed further below, the presence of more than one safety network controller 100 in the electronic safety system 200 can enhance the reliability of the system in the event of a device or network failure, e.g., by supporting multiple communication paths between the safety device controllers 210 and safety network controllers 100 of the electronic safety system 200. Further, each safety device controller 210 is preferably hot-swappable, such that they can be replaced while the other safety device controllers 210 are working, thereby avoiding the need to power down the entire system to perform service.

Some embodiments of the present disclosure comprise a bridging connection 230a that communicatively connects serial ports 150a, 150b such that serial communication received by the safety network controller 100a on one of the serial ports 150a, 150b from one of the daisy chain networks 250a, 250b can be forwarded to the other daisy chain network 250a, 250b. Accordingly, the daisy chain networks 250a, 250b may be segments of a longer daisy chain network passing through the safety network controller 100a via the bridging connection 230a between the serial ports 150a, 150b.

Similarly, safety network controller 100b may comprise a bridging connection 230b that communicatively connects serial ports 150c, 150d such that serial communication received on one of the serial ports 150c, 150d from one of the daisy chain networks 250a, 250b can be forwarded to the other daisy chain network 250a, 250b. Accordingly, the daisy chain networks 250a, 250b may be segments of a ring network when communicatively connected to each other via the bridging connection 230a between the serial ports 150a, 150b and via the bridging connection 230b between the serial ports 150c, 150d.

It should be noted that, although the example of FIG. 3 depicts daisy chain networks 250a, 250b, other embodiments of the electronic safety system 200 may comprise one or more linear networks or multi-drop buses, e.g., in addition to (or as an alternative to) one or more of the daisy chain networks 250a, 250b.

At least one of the safety network controllers 100a, 100b is responsible for control over at least one of the safety device controllers 210a-d. According to a particular example, responsibility for control over the safety device controllers 210a-d is divided between the safety network controllers 100a, 100b such that each of the safety device controllers 210a-d is only controlled by one of the safety network controllers 100a, 100b at a time. In this regard, a safety network controller 100a (for example) may be considered a master safety network controller with respect to a particular safety device controller 210a over which the safety network controller 100a has responsibility for control.

Responsibility for control over a safety device controller 210 may also be exchanged between the safety network controllers 100a, 100b, e.g., in response to detecting certain conditions within the electronic safety system 200. For example, safety network controller 100a may surrender control over safety device controller 210a to safety network controller 100b in response to a failure in the electronic safety system 200. Accordingly, safety network controller 100b may be considered to be redundant to safety network controller 100a at least with respect to control over the safety device controller 100b. Particular failure scenarios in which such an exchange may be performed will be explained in further detail below.

Figure 4:
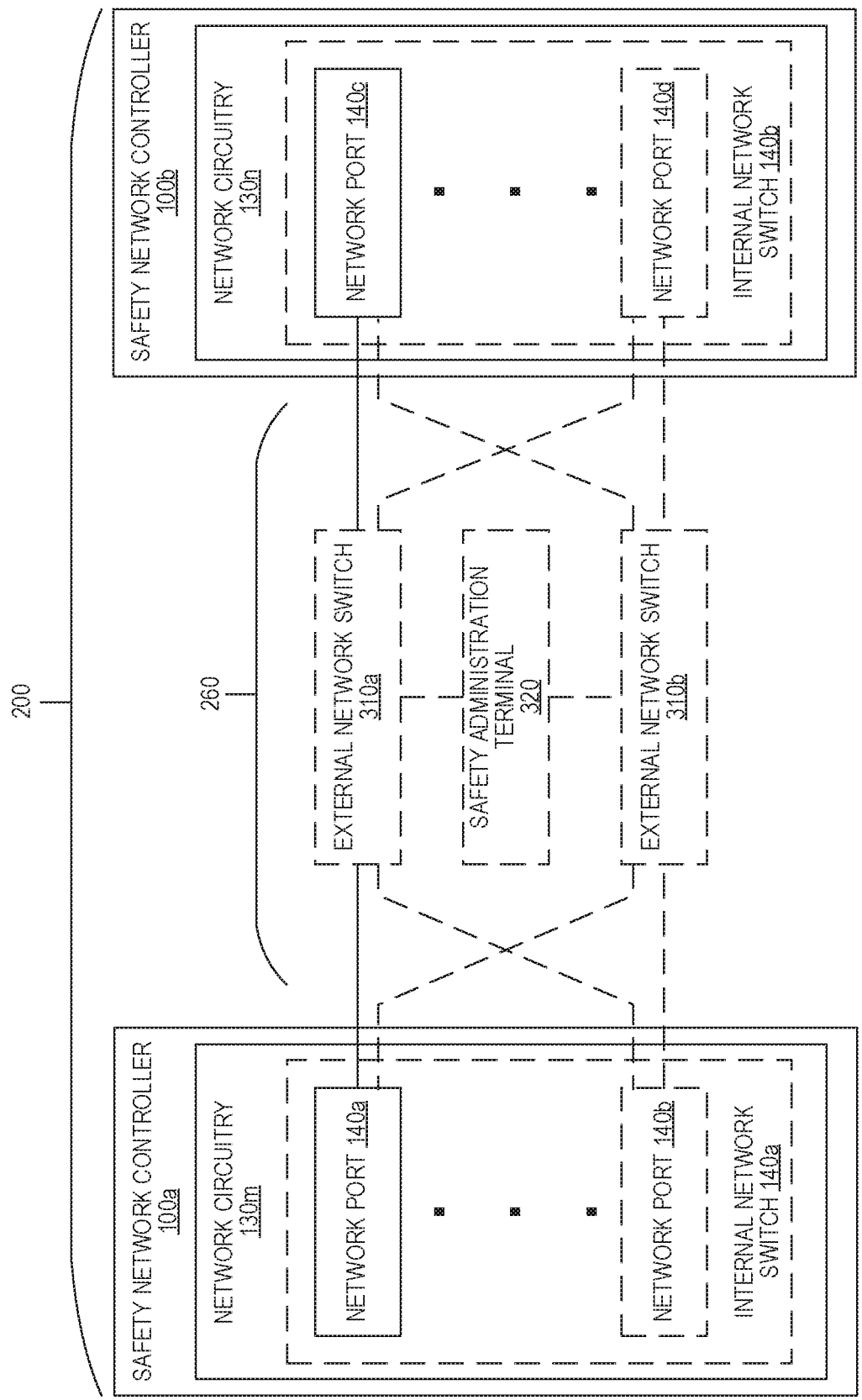
FIG. 4 is a schematic block diagram illustrating an example of a packet switched network connecting safety network controllers, according to one or more embodiments of the present disclosure.

In addition to serial communication, the electronic safety system 200 also supports packet-based network communication. FIG. 4 is a schematic block diagram illustrating, in greater detail, a relatively simple example of a packet switched network 260 connecting the network circuitry 130m of safety network controller 100a to the network circuitry 130n of safety network controller 100b. As shown in the example of FIG. 4, the packet switched network 260 may, in some embodiments, simply comprise a cabled connection from a network port 140a of safety network controller 100a to a network port 140c of safety network controller 100b. In this way, the network circuitry 130m, 130n of the safety network controllers 100a, 100b may exchange data packets with each other, e.g., to share device status information.

Other embodiments may include one or more additional network ports 140b, 140d, and/or network switches 140a-b, 310a-b. For example, in some embodiments the network circuitry 130 of a safety network controller 100 may comprise a plurality of network ports 140, each of which supports at least one packet-switched path between the safety network controllers 100a, 100b. According to a simple example, safety network controller 100a may comprise network ports 140a and 140b, each of which may be connected directly to respective network ports 140c, 140d of safety network controller 100b, e.g., via a cabled connection.

In some embodiments, a safety network controller 100 may comprise an internal network switch 140. The internal network switch 140 may comprise the network ports 140 of the safety network controller 100 and be configured to selectively transmit via one, some, or all the network ports 140 in order to communicate via specific paths of the packet network 260. In some embodiments, an internal network switch 140a, 140b is configured to forward packets received on a first network port 140a, 140c for transmission on a second network port 140b, 140d, or vice versa, as appropriate.

Additionally or alternatively, the packet network 260 may comprise one or more external network switches 310a-b, each of which may be connected to one or more of the network ports 140a-d of any of the safety network controllers 100a-b. In some particular embodiments, the network circuitry 130 is configured to communicatively connect to the redundant safety network controller 100b via a plurality of packet-switched paths, each of which has an initial hop at a respective one of the external network switches 310a, 310b. Each of the external network switches 310a, 310b is configured to forward one or more packets received from one of the safety network controllers 100a, 100b to the other of the safety network controllers 100b, 100a.

In some embodiments, the packet network 260 further comprises a safety administration terminal 320 that is remote from the safety network controllers 100a, 100b. The safety administration terminal 320 may, for example, be a computer configured to monitor the status of the devices comprised in the electronic safety system 200. In this regard, the safety network controllers 100a, 100b may each exchange status information with the safety administration terminal 320, e.g., via one or more of the external network switches 310a, 310b.

For example, a safety network controller 100 may receive a request for status information from the safety administration terminal 320 (e.g., periodically), and transmit a response comprising a status of one or more of the safety network controllers 100, external network switches 310, safety device controllers 210, and/or safety devices 220. In some such embodiments, the safety network controller 100 transmits the response over a plurality of network ports 140, e.g., to enhance the likelihood that the response will be received by the safety administration terminal 320. For example, by transmitting the response via a plurality of packet-switched paths (e.g., via a plurality of network ports 140 and/or a plurality of external network switches 310), the safety administration terminal 320 can receive the response even if, e.g., one of the external network switches 310 drops packets or suffers a network failure.

Accordingly, in some embodiments, a safety network controller may scan the safety device controllers 210 of one or more daisy chain networks 250, and in response, communicates over the packet-switched network 260 so that the status (e.g., health status) of the system may be inspected. These status messages in particular may be sent on multiple network ports 140, e.g., periodically and/or in response to receiving a status request. Accordingly, one or more aspects of the electronic safety system 200 can be checked for problems on an ongoing basis. Among other things, the safety network controllers 200a, 200b, the safety device controllers 210, the external network switches 310a, 310b, and/or wiring may be checked.

The redundancy provided by particular embodiments enable the system to be treated as a single large matrix of devices, particularly from the perspective of the safety administration terminal 320, which may establish automation routines based on observed activity. For example, the safety administration terminal 320 may be configured to use the output of one device as an input to another device within the system. Additionally or alternatively, the safety administration terminal 320 may be configured to trigger actions or commands in response to certain device outputs.

Should a failure occur, the electronic safety system 200 is designed to continue operation. Further, a user may be alerted, e.g., by a safety network controller 100 and/or safety administration terminal 320. Various failure scenarios will be discussed in greater detail below.

Figure 5:
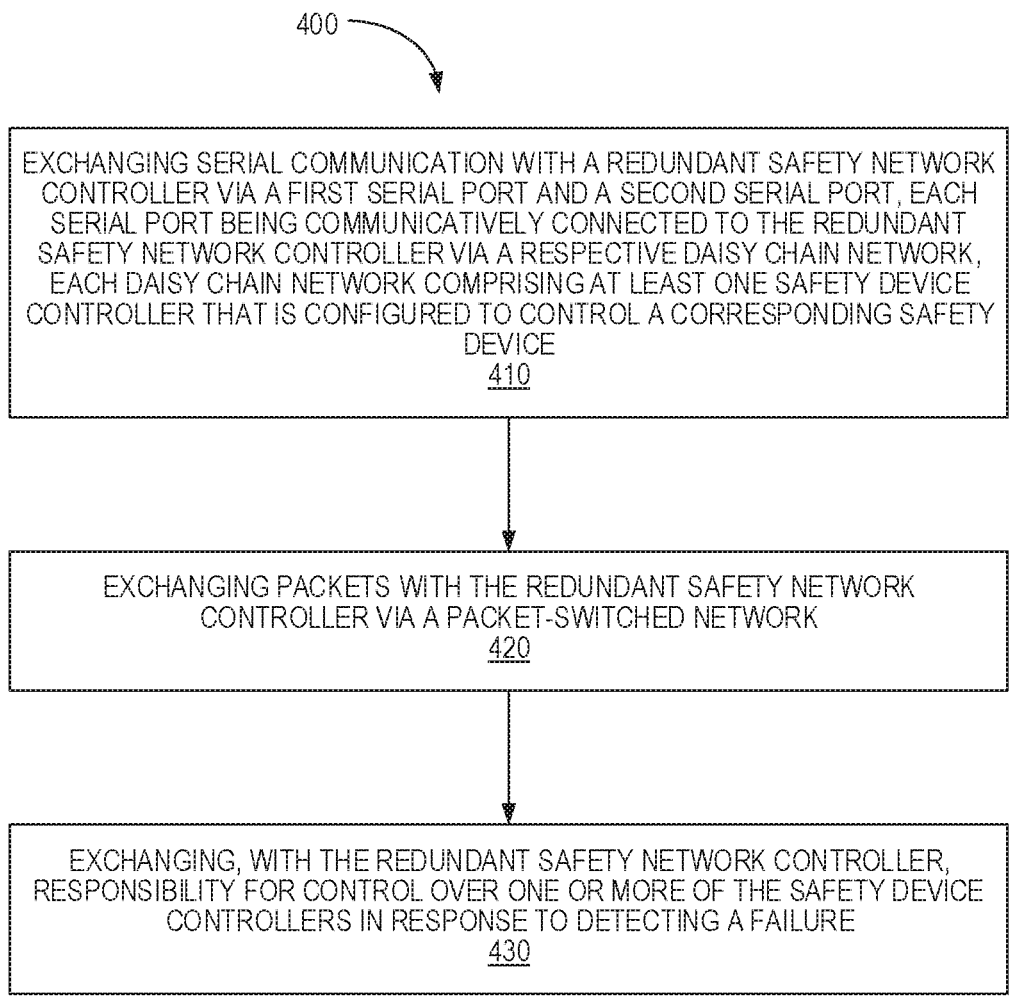
FIG. 5 is a flow diagram illustrating an example method implemented by a safety network controller, according to one or more embodiments of the present disclosure.

In view of the above, and as illustrated in the flow diagram of FIG. 5, embodiments of the present disclosure include a method 400 implemented by a safety network controller 100a in an electronic safety system 200. The method 400 comprises exchanging serial communication with a redundant safety network controller 100b via a first serial port 150a and a second serial port 150b, each serial port 150a, 150b being communicatively connected to the redundant safety network controller 100b via a respective daisy chain network 250a, 250b (block 410). Each daisy chain network 250a, 250b comprises at least one safety device controller 210a-d that is configured to control a corresponding safety device 220a-d. The method 400 further comprises exchanging packets with the redundant safety network controller 100b via a packet-switched network 260 (block 420). The method 400 further comprises exchanging, with the redundant safety network controller 100b, responsibility for control over one or more of the safety device controllers 210a-d in response to detecting a failure (block 430).

Correspondingly, consistent with the previous examples, embodiments of the present disclosure include a safety network controller 100a configured to perform the method 400. In particular, the safety network controller 100a may comprise a first serial port 150a and a second serial port 150b, each of which is configured to communicatively connect to a redundant safety network controller 100b via a respective daisy chain network 250a, 250b. Each such daisy chain network 250a, 250b comprises at least one safety device controller 210a-d that is configured to control a corresponding safety device 220a-d. The safety network controller 100a further comprises network circuitry 130 configured to communicatively connect to the redundant safety network controller 100b via a packet-switched network 260. The safety network controller 100a further comprises processing circuitry 110 communicatively connected to the network circuitry 130 and each of the serial ports 150a, 150b. The processing circuitry 110 is configured to exchange, with the redundant safety network controller 110b, serial communication via each of the daisy chain networks 250a, 250b, and packets via the packet-switched network 260. The processing circuitry is further configured to exchange, with the redundant safety network controller 110b, responsibility for control over one or more of the safety device controllers 210a-d in response to detecting a failure.

Such a failure, according to various embodiments of the present disclosure, may occur in one or more locations within the electronic safety system 200. Examples of such failures include (but are not limited to) one or more failures of a safety network controller 100, a daisy chain network 250, a packet-switched network 260, and/or a safety device controller 210.

Figure 6A:
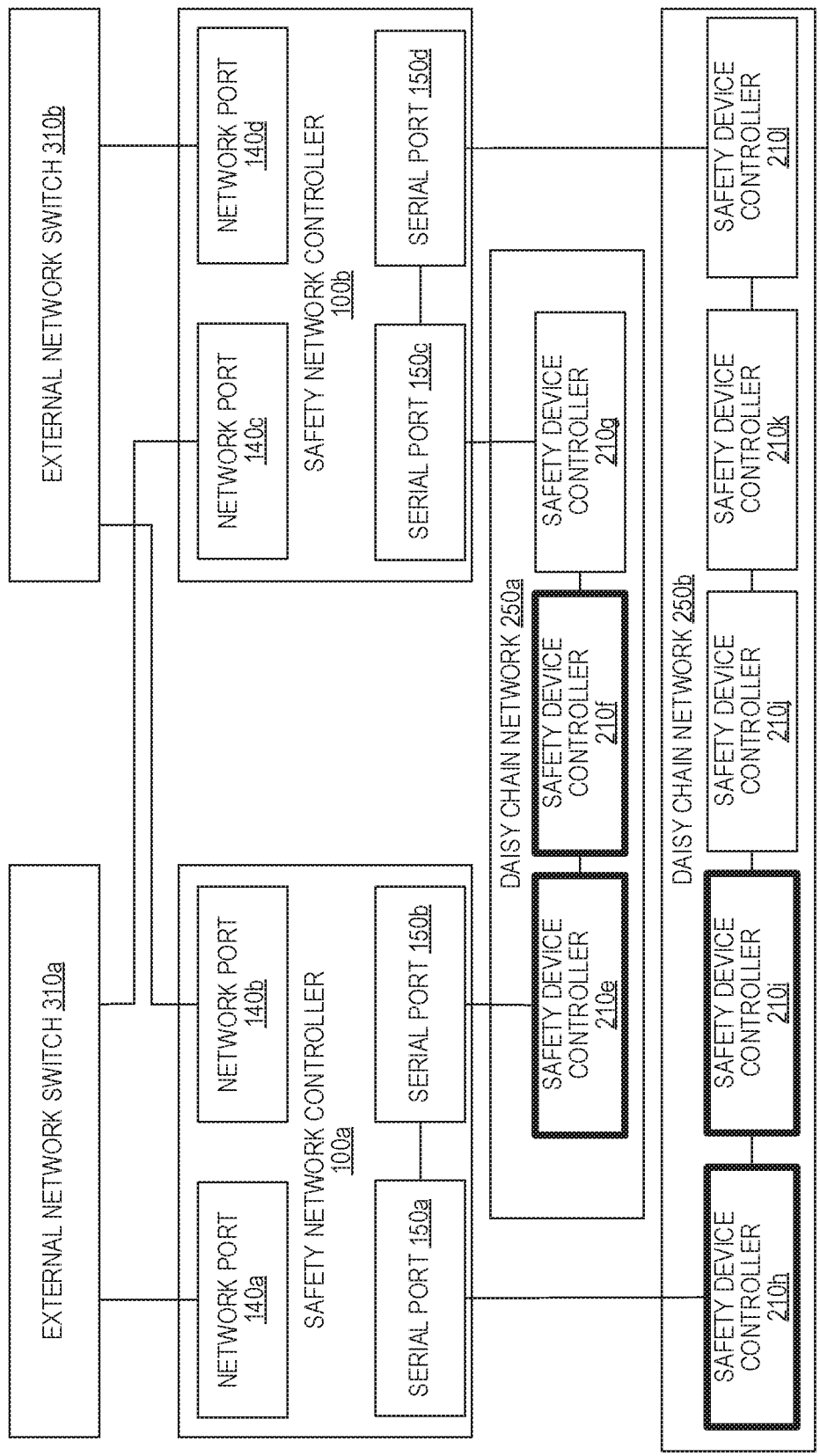
FIG. 6A is a schematic block diagram illustrating an example redundant configuration of safety network controllers, according to one or more embodiments of the present disclosure.

FIG. 6A illustrates an example of a redundant configuration of safety network controllers 100a, 100b suitable for a variety of embodiments disclosed herein. In the example of FIG. 6A, daisy chain network 250a comprises safety device controllers 210e-g, whereas daisy chain network 250b comprises safety device controllers 210h-l.

According to this example, the presence of safety network controllers 100a, 100b that are redundant to each other prevents each from being a "single point of failure" in the electronic safety system 200. Further, because each of the daisy chain networks 250a, 250b is connected to each of the safety network controllers 100a, 100b, no single point of failure in either daisy chain network 250a, 250b is able to cut off any functioning safety device controller 210e-l from communicating with at least one of the safety network controllers 100a, 100b.

Further still, because the serial ports 150a-b, 150c-d of each respective safety network controller 100a, 100b are communicatively connected to each other in this example, each of the safety network controllers 100a, 100b can communicate with any of the safety device controllers 210e-l either directly over via the other daisy chain network 250 and safety network controller 100b, 100a. For example, safety network controller 100a can send a message to safety device controller 210e directly through serial port 150b. Alternatively, safety network controller 100a may (e.g., if there is a problem with serial port 150b) send a message to safety device controller 210e through serial port 150a, which is passed through daisy chain network 250b to safety network controller 100b at serial port 150d, which is then forwarded through daisy chain network 250a to safety device controller 210e via serial port 150c.

The safety network controllers 100a, 100b may, in some embodiments, divide responsibility for controlling the safety device controllers 210e-l of each daisy chain network 250a, 250b between themselves such that each controls at least one safety device controller 210 per daisy chain network 250. A process for establishing which of the safety network controllers 100a, 100b are to be responsible for control over which of the safety device controllers 210e-l may be performed during initialization of the safety device controllers 210e-l. Such an initialization process may be performed, for example, upon power up of one or more of the safety network controllers 100a, 100b. An example initialization process will be described in further detail below.

According to this particular example, the process for dividing responsibility for control of the safety network controllers 210e-l results in safety network controller 100a being responsible for control over safety device controllers 210e, 210f on daisy chain network 250a, and safety device controllers 210h, 210i on daisy chain network 250b. Correspondingly, in this example, safety network controller 100b is responsible for control of safety device controller 210g on daisy chain network 250a, and safety device controllers 210j, 210k, 210l on daisy chain network 250b. Safety device controllers 210e-f, 210h-l are depicted in FIG. 6A in more thickly-lined boxes to highlight the safety device controllers 210e-l that safety network controller 100a is responsible for control over in this example.

Figure 6B:
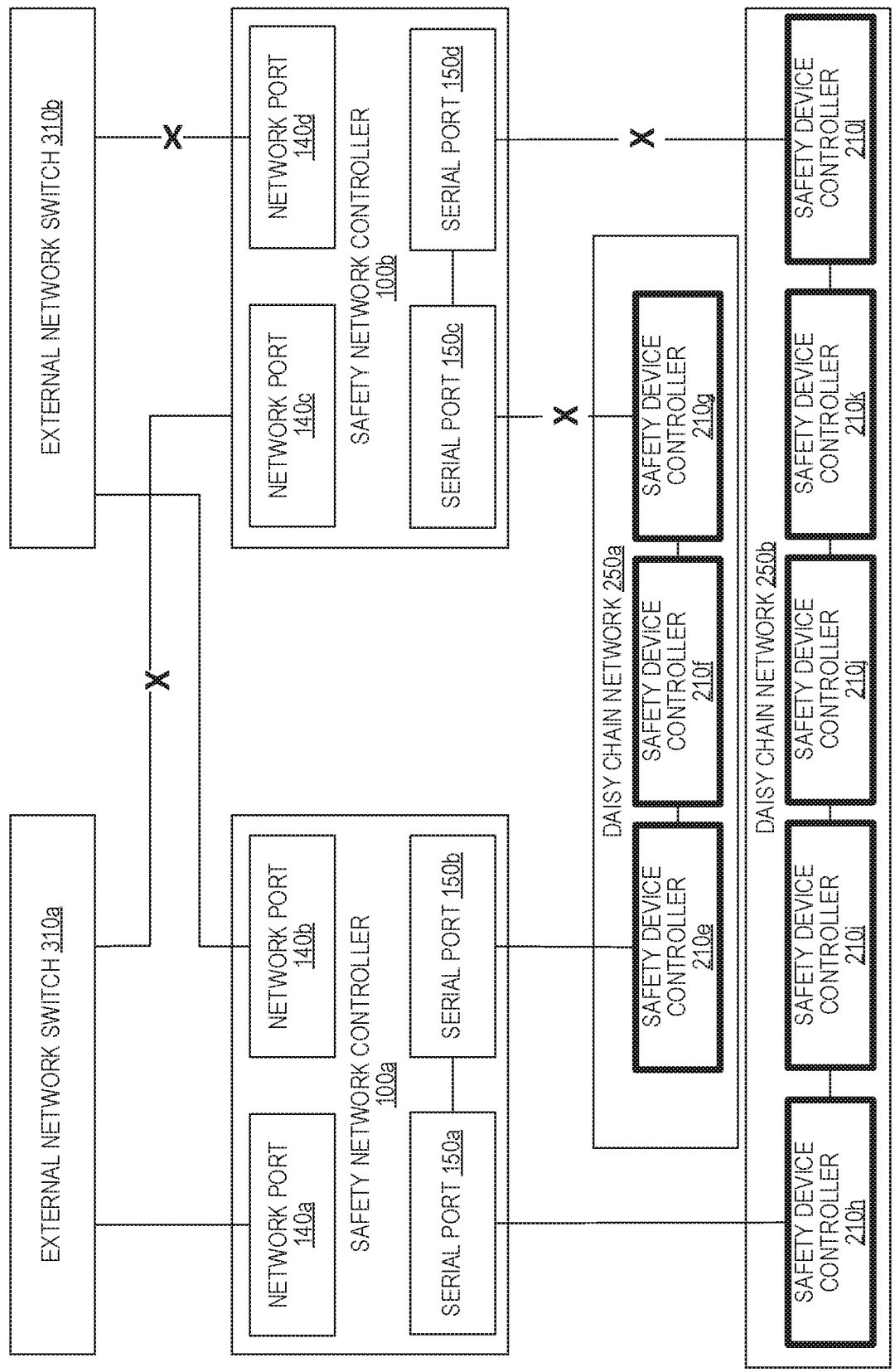
FIGS. 6B-6F are schematic block diagrams illustrating example failure scenarios that may occur within the redundant configuration of safety network controllers illustrated in FIG. 6A, according to one or more embodiments of the present disclosure.

FIG. 6B illustrates an example in which the safety network controllers 100a, 100b exchange responsibility for control over one or more of the safety device controllers 210e-l in response to a failure that occurs while the electronic safety system is configured according to FIG. 6A. In this particular example, in response to detecting a failure in the safety network controller 100b (represented in FIG. 6B by the loss of connectivity), safety network controller 100a takes control over all of the safety device controllers 210g, 210j-1 on the daisy chain networks 250a, 250b that were controlled by safety network controller 100b as was illustrated in FIG. 6A. As a result, in this example, the safety network controller 100a is responsible for control over safety device controllers 210e-l (as shown in FIG. 6B by the bolded boxes).

Figure 6C:
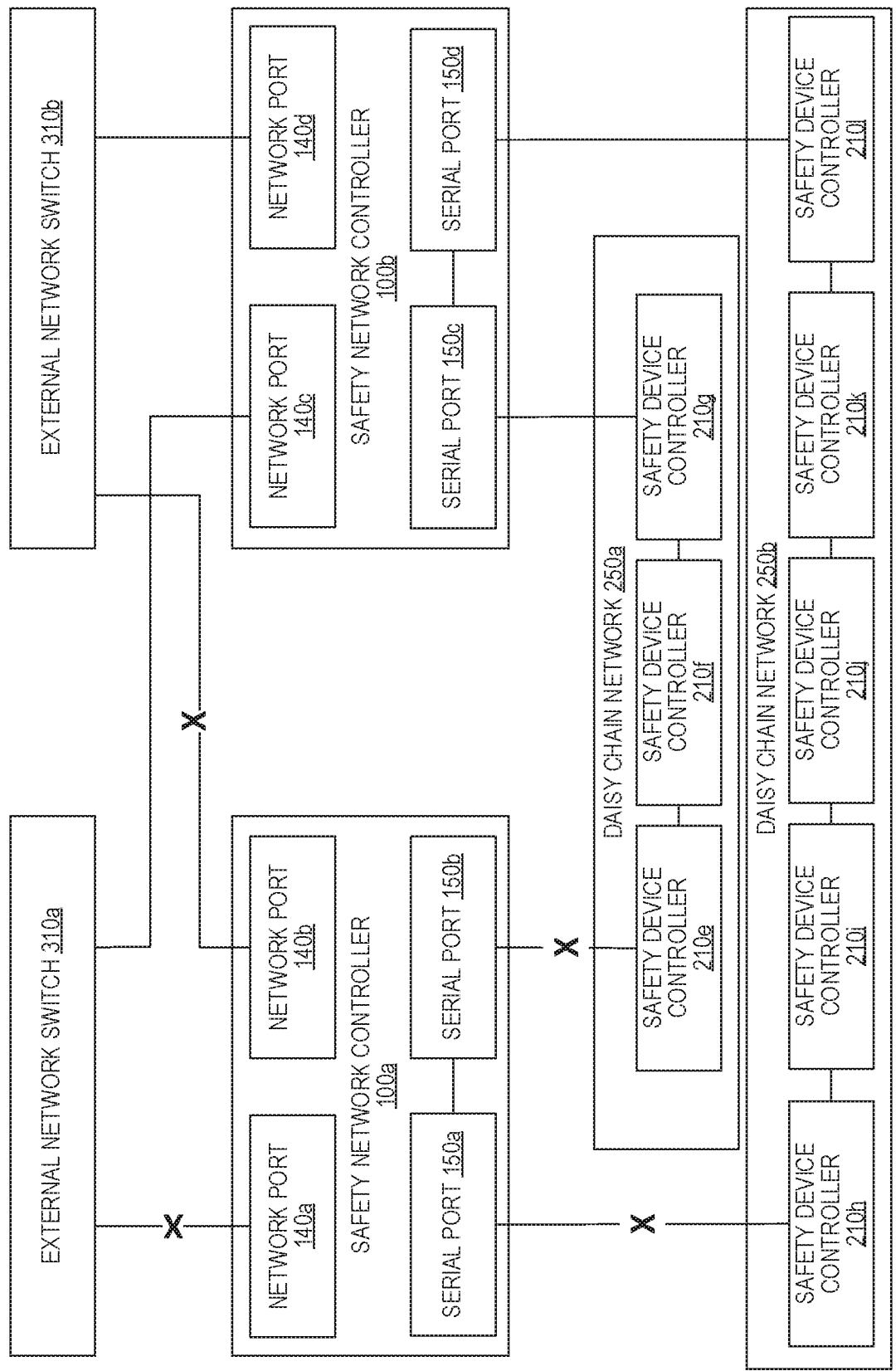

FIG. 6C illustrates another example in which the safety network controllers 100a, 100b exchange responsibility for control over one or more of the safety device controllers 210e-l in response to a failure that occurs while the electronic safety system is configured according to FIG. 6A. In the example of FIG. 6C, in response to detecting a failure in the safety network controller 100a (represented in FIG. 6C by loss of connectivity), safety network controller 100a surrenders control over all of the safety device controllers 210e-f, 210h-j on the daisy chain networks 250a, 250b controlled by safety network controller 100a to safety network controller 100b. As a result, in this example, the safety network controller 100b is responsible for control over safety device controllers 210e-l (as shown in FIG. 6C by the lack of any bolded boxes).

Figure 6D:
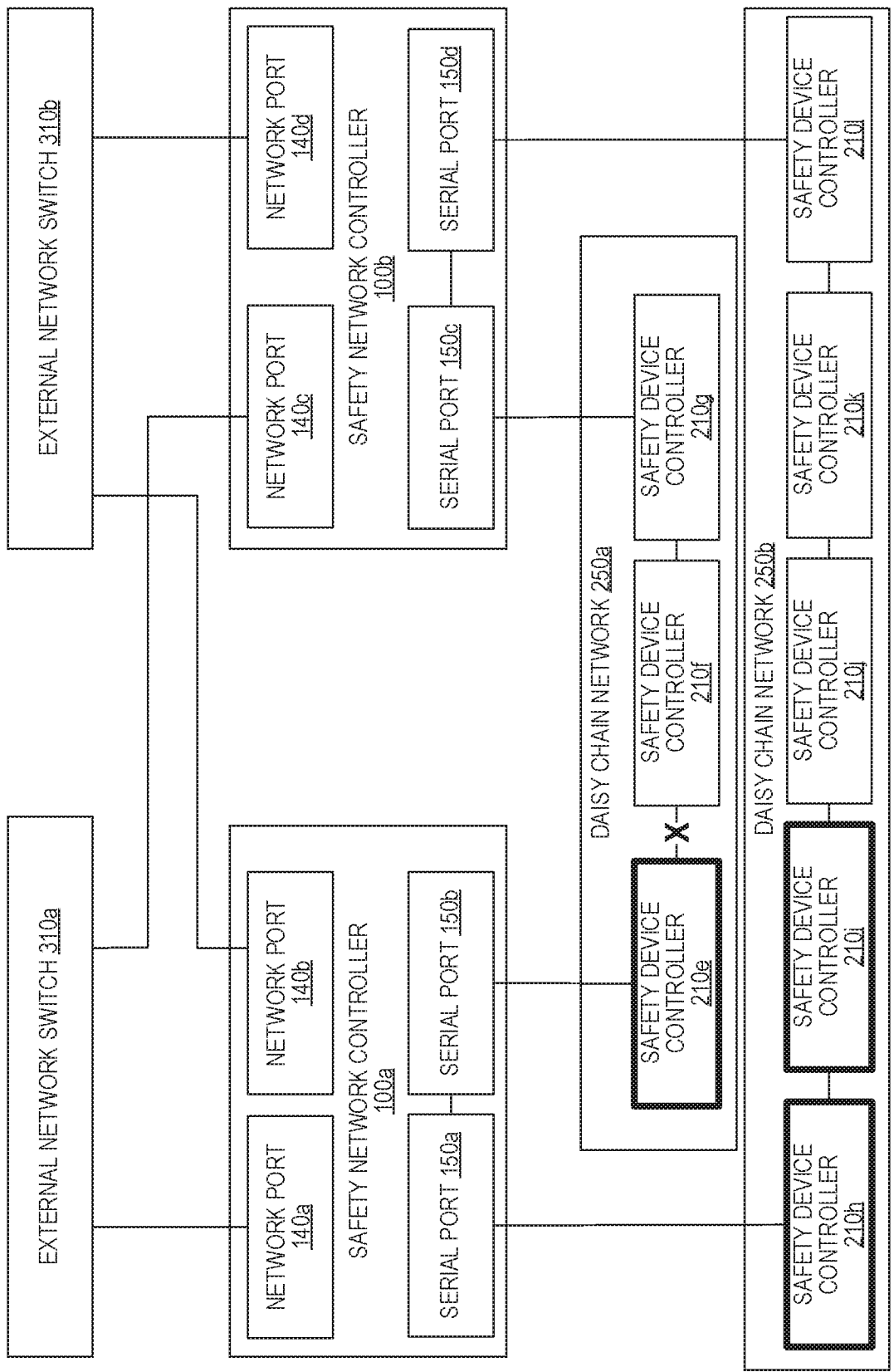

FIG. 6D illustrates another example in which the safety network controllers 100a, 100b exchange responsibility for control over one or more of the safety device controllers 210e-l in response to a failure that occurs while the electronic safety system is configured according to FIG. 6A. As shown in the example of FIG. 6D, in response to detecting a failure in one of the daisy chain networks 250a, safety network controller 100a surrenders control over safety device controller 210f to safety network controller 100b, safety device controller 210f being at a point on the daisy chain network 250a that is beyond the failure relative to safety network controller 100a.

Figure 6E:
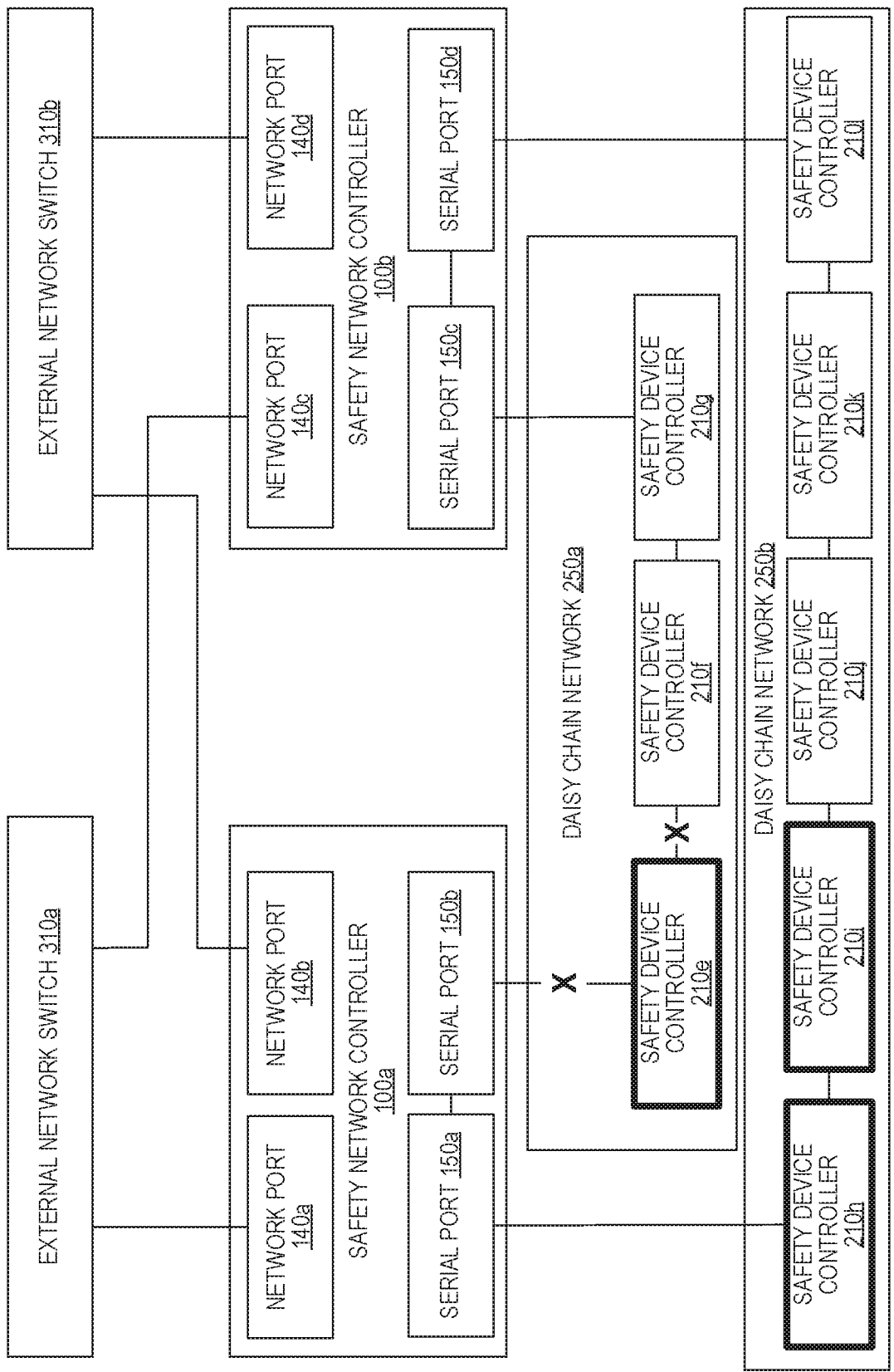

FIG. 6E illustrates yet another example in which the safety network controllers 100a, 100b exchange responsibility for control over one or more of the safety device controllers 210e-l in response to a failure that occurs while the electronic safety system is configured according to FIG. 6A. Similar to the example of FIG. 6D, in the example of FIG. 6E, the failure occurs in one of the daisy chain networks 250a. In contrast to FIG. 6D however, safety device controller 210e fails, as reflected by its loss of connectivity. In response to detecting the failure in safety device controller 210e in daisy chain network 250a, safety network controller 100a surrenders control over safety device controller 210f to safety network controller 100b (safety device controller 210f being at a point on the daisy chain network 250a that is beyond the failure).

Figure 6F:
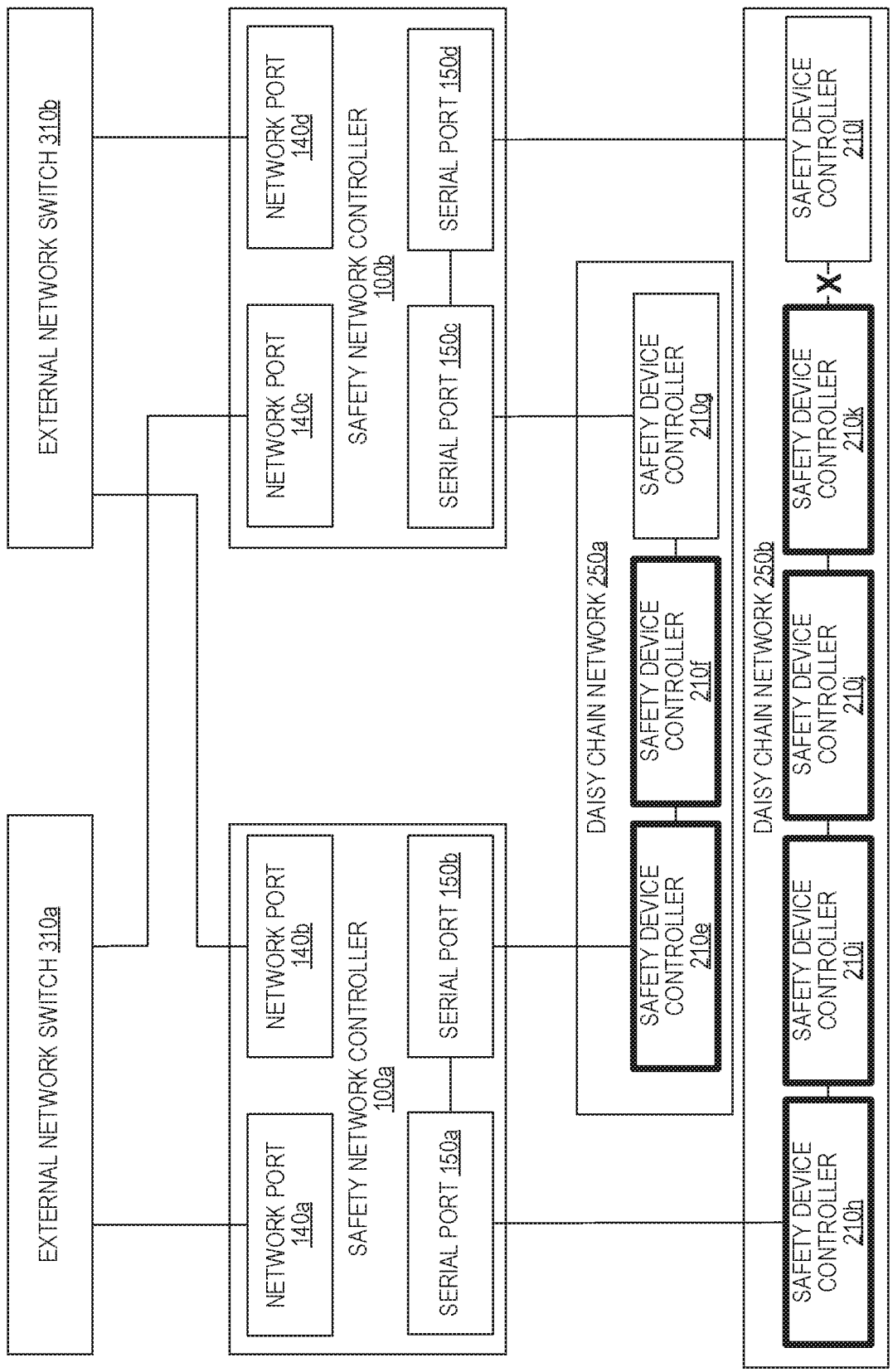

FIG. 6F illustrates another example in which the safety network controllers 100a, 100b exchange responsibility for control over one or more of the safety device controllers 210e-l in response to a failure that occurs while the electronic safety system is configured according to FIG. 6A. In the example of FIG. 6F, the failure occurs in one of the daisy chain networks 250b. In response to detecting the failure in daisy chain network 250b, safety network controller 100a takes control over safety device controllers 210j, 210k from safety network controller 100b, safety device controllers 210j, 210k being at a point on the daisy chain network 250b before the failure.

Although the previous examples have illustrated a daisy chain network 250 that comprises up to five safety device controllers 210 in series, embodiments may include any number safety device controllers 210 on a given daisy chain network 250. It this regard, each safety device controller 210 may be configured to relay power from a power source (e.g., a safety network controller 100) to a neighboring safety device controller 210.

Figure 7:
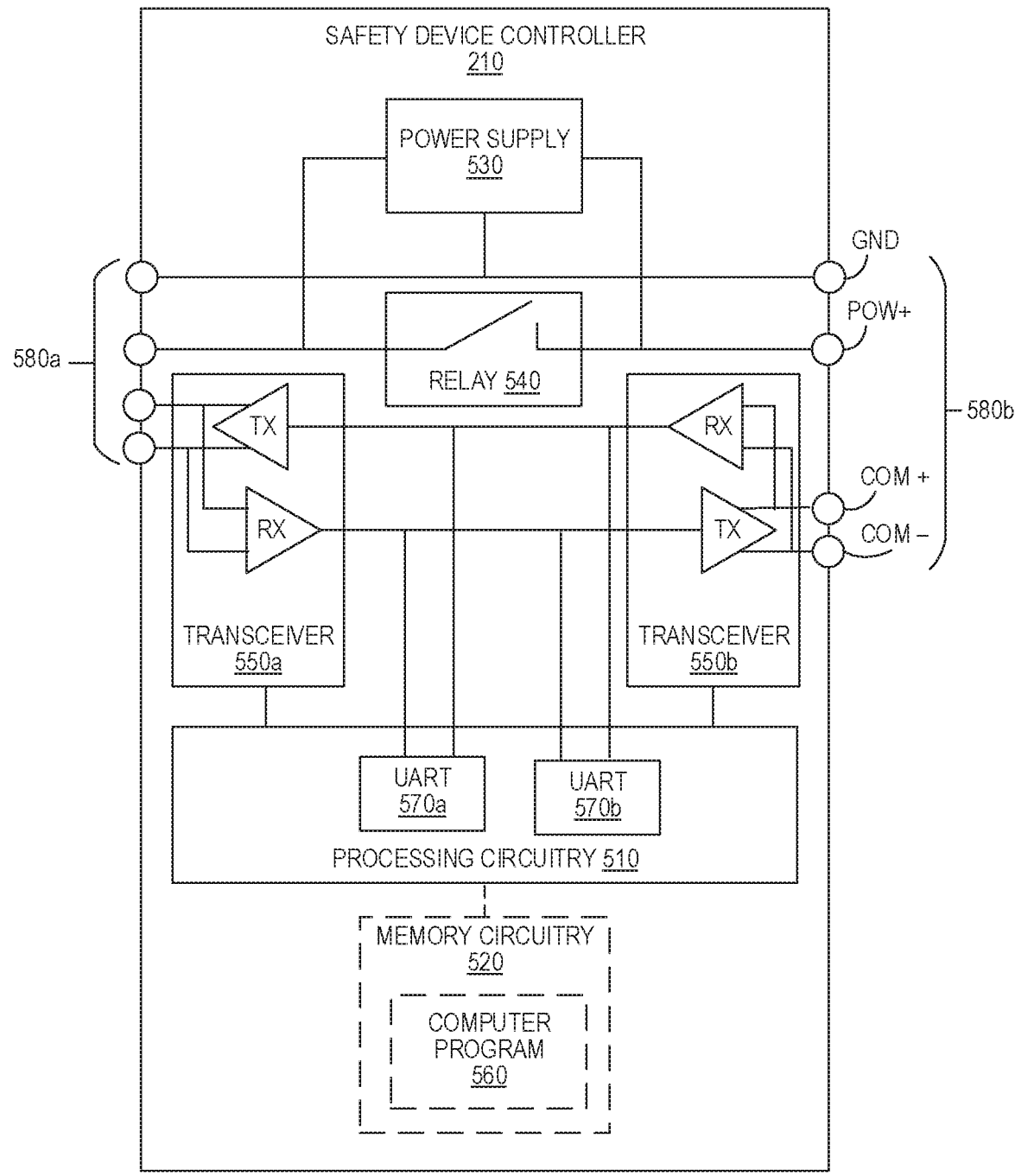
FIG. 7 is a schematic diagram of an example safety device controller, according to one or more embodiments of the present disclosure.

FIG. 7 is a schematic diagram of an example safety device controller 210. The safety device controller 210 comprises processing circuitry 510, a power supply 530, a relay 540, two transceivers 550a, 500b, and two four-pin connectors 580a, 580b.

The connectors 580a, 580b enable the safety device controller 210 to act as a node on a daisy-chain network 250. Each of the connectors 580a, 580b comprises a ground pin (GND), a power pin (POW+), and two serial communication pins (COM+, COM−). The relay 540 is configured to relay power received over either of the connectors 580a, 580b to the other of the connectors 580b, 580a when the relay is engaged. When disengaged, power is not relayed from between the connectors 580a, 580b.

The power supply 530 is configured to regulate power to the components of the safety device controller 210. Although not shown (for simplicity), the power supply is electrically coupled to provide appropriate power to the various components of the safety device controller 210.

Each of the transceivers 550a, 550b is configured to be switchable between transmit and receive modes, e.g., in response to control signaling from the processing circuitry 510.

The processing circuitry 510 may comprise one or more microprocessors, microcontrollers, hardware circuits, discrete logic circuits, hardware registers, digital signal processors (DSPs), field-programmable gate arrays (FPGAs), application-specific integrated circuits (ASICs), or any combination thereof. For example, the processing circuitry 510 may be programmable hardware capable of executing software instructions stored, e.g., as a machine-readable computer program 560 in memory circuitry 520 of the safety device controller 210. The memory circuitry 520 of the various embodiments may comprise any non-transitory machine-readable media known in the art or that may be developed, whether volatile or non-volatile, including but not limited to solid state media (e.g., SRAM, DRAM, DDRAM, ROM, PROM, EPROM, flash memory, solid state drive, etc.), removable storage devices (e.g., Secure Digital (SD) card, miniSD card, microSD card, memory stick, thumb-drive, USB flash drive, ROM cartridge), fixed drive (e.g., magnetic hard disk drive), or the like, entirely or in any combination.

In particular, the processing circuitry 510 comprises two Universal Asynchronous Receiver-Transmitters (UARTs), each configured to serialize data into individual bits for transmission and assemble bits that are received into blocks of data.

With reference again to FIG. 6A, to initialize the safety device controllers 210e-g of daisy chain network 250a (for example), safety network controller 100a may, upon power up, begin relaying power via serial port 150b. The relay 540 of safety device controller 210e may be initially disengaged, such that safety device controller 210e is not initially relaying power to safety device controller 210f. Accordingly, power is also not being relayed to safety device controller 210g by safety network controller 100a. That said, safety network controller 100b may be powering up concurrently with safety network controller 100a, for example. Therefore, safety network controller 100b may similarly be relaying power to safety device controller 210g via serial port 150c. As such, safety device controllers 210e and 210g may be initializing in parallel using power from respective safety network controllers 100a, 100b.

Upon receiving power, both transceivers 550a, 550b may be configured to initially start in receive mode. This may, for example, enable the safety device controller 210e to respond to an initial message regardless of whether that initial message is received via connector 580a (connected to safety network controller 100a, in this example) or connector 580b (connected to safety device controller 210f, in this example).

The safety device controller 210e receives an identification request from safety network controller 100a, and responds with an identifier of the safety device controller 210e. To respond to the safety network controller 100a, the safety device controller 210e may set transceiver 550a (i.e., which received the identification request) to transmit mode. The transmitted identifier may, for example, be unique on the daisy chain network 250a. According to one particular example, the identifier is a three-byte value that is unique at least among the identifiers of the safety device controllers 210e-g on daisy chain network 250a, and may (in some embodiments) further be unique among the identifiers of safety device controllers 210h-l as well.

After having received the identification request and responded with the identifier, the safety device controller 210e sets transceiver 550a to receive mode, and sets transceiver 550b to transmit mode. In particular, this configuration may permit messages received by transceiver 550a to pass through to transceiver 550b little (if any) processing performed by the processing circuitry 510. More specifically, once the transceivers 550a, 500b are configured in this fashion, safety device controller 210e may pass a subsequent identification request from safety network controller 100a on to safety device controller 210f with little delay. Upon receiving this subsequent identification request (or, alternatively, once the transceivers 550a, 500b are configured to support passthrough), the safety device controller 210e may activate its relay 540 to relay power from safety network controller 100a to safety device controller 210f.

In this way, the safety network controller 100a is configured to discover each of the safety device controllers 210e-g of the daisy chain network 250a, i.e., by transmitting identification requests on the daisy chain network 250a until the safety network controller 100a fails to receive a corresponding response comprising a safety device identifier. More generally, a safety network controller 100 may, according to various embodiments, discover one, some, or each of the safety device controllers 210 of one, some, or each of the daisy chain networks 250 to which the safety network controller 100 is connected.

To ensure that the responses to messages which have been passed through are able to return to safety network controller 100a, in response to passing a message through, the safety device controller 210e is configured to exchange transmit and receive roles between the transceivers 550a, 550b. In this example, after having passed through the subsequent identification request to safety device controller 210f, safety device controller 210e is configured to set transceiver 550a to transmit mode, and set transceiver 550b to receive mode. When safety device controller 210e receives the response from safety device controller 210f, the safety device controller 210e passes the message on, and exchanges the transmit and receive modes between the transceivers 550a, 550b again.

Not all messages received by the safety device controller 210e are to be passed through however. Thus, the safety device controller 210e may be configured to analyze messages as they are received, and forward a message in response to determining that the message is not addressed to the safety device controller 210e. For example, the safety device controller 210e may check whether the message comprises the identifier provided to the safety network controller 100.

Correspondingly, the safety device controller 210e may respond to a message in response to determining that the message is addressed to the safety device controller 210e. In particular, the safety device controller 210e may receive a command that comprises the identifier of the safety device controller 210e, may execute that command (e.g., using processing circuitry 510), and transmit a response that acknowledges that the command was executed and/or reports an outcome of the command (e.g., by reporting a status of the safety device controller 210e).

In some embodiments, the safety device controller 210e may set both transceivers 550a, 550b to receive mode, e.g., to listen for messages arriving via either connector 580a, 580b. For example, the safety device controller 210e may set both transceivers 550a, 550b to receive mode in response to all of the safety device controllers 210e-g being discovered by one or each of the safety network controllers 100a, 100b. The transceivers may switch between transmit and receive modes as necessary to pass messages through that are not addressed to the safety device controller 210e and permit a corresponding response to be passed back.

Figure 8:
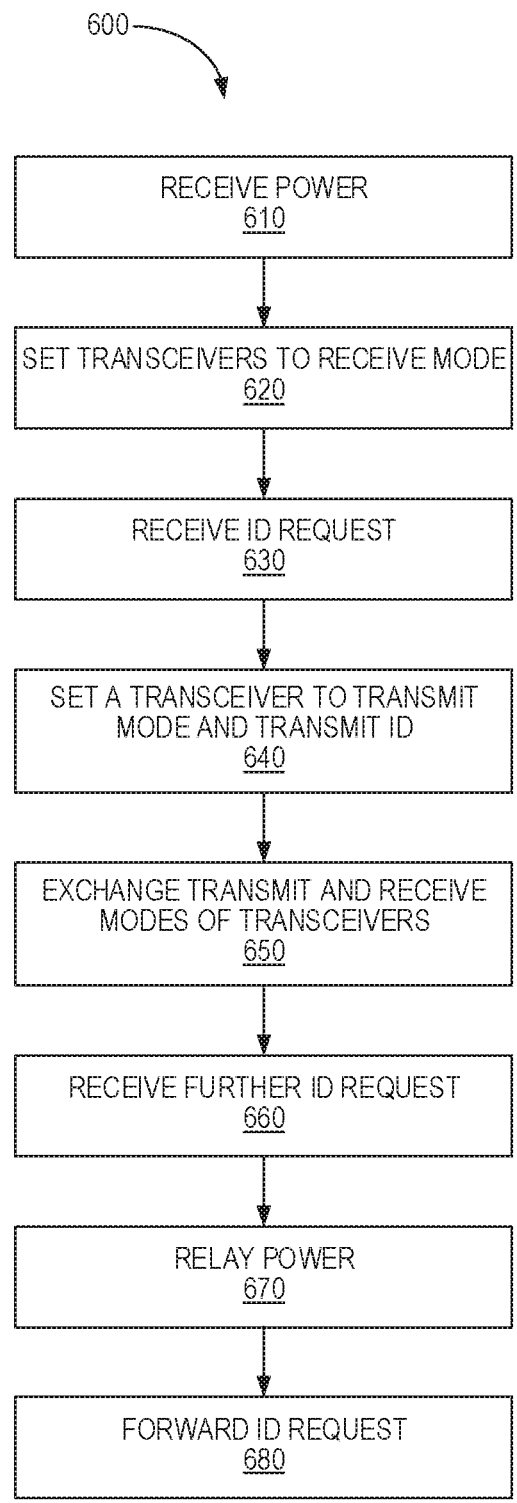
FIG. 8 is a flow diagram illustrating an example method implemented by a safety device controller, according to one or more embodiments of the present disclosure.

In view of the above, FIG. 8 illustrates an example method 600 implemented by a safety device controller 210 of an electronic safety network 200. The method 600 comprises receiving power from a safety network controller 100 (block 610). The method 600 further comprises setting each of a plurality of transceivers 550a, 550b of the safety network controller 210 to receive mode (block 620). The method 600 further comprises receiving, from the safety network controller 100, an identification request (block 630). The method 600 further comprises setting one of the transmitters 550a, 550b to transmit mode, and transmitting an identifier of the safety device controller 210 to the safety network controller 100 via the transmitter 550 set to transmit mode in response to the identification request (block 640).

The method 600 further comprises exchanging transmit and receive modes between the transmitters 550a, 550b in response to transmitting the identifier (block 650). The method 600 further comprises receiving a further identification request from the safety network controller 100 (block 660), and in response, relaying power to a further safety device controller 210 (block 670), and forwarding the further identification request to the further safety device controller 210 (block 680). The method 600 may, in some embodiments, include one or more other features as described above.

As noted above, embodiments that include multiple safety network controllers 100a, 100b may concurrently discover the safety device controllers 210 on one or more daisy chain networks 250. In some embodiments, a scenario may arise in which, for example, adjacent safety device controllers 210f and 210g have transceivers 550 oriented towards each other that are both in transmit mode, such that neither is able to receive a message from the other. In such an occasion, the discovery procedures of the safety network controllers 100a, 100b with respect to the corresponding daisy chain network 250a may stop when a timeout occurs after a threshold duration of awaiting a response to a given identification request. Among other things, a safety device controller 210 may be configured to set both transceivers 550a, 550b to receive mode after a time out occurs with respect to awaiting a response to a communication that safety device controller 210 has previously passed through.

In particular, in some embodiments, responsibility for control over the safety device controllers 210 of a daisy chain network 250 may be integrated into the discovery/initialization process, e.g., by each safety network controller 100a, 100b taking responsibility for the safety device controllers 210 that respond to its identification requests. In other embodiments, the safety network controllers 100a, 100b, may handshake or negotiate for control. In at least some preferred embodiments, each safety network controller 100a, 100b is responsible for control over at least one safety device controller 210 in each linear network 250. In particular, the safety network controllers 100a, 100b may divide responsibility for controlling the safety device controllers 210 of each daisy chain network 250 between themselves after initialization and discovery of the safety device controllers 210.

After the safety device controllers 210e-g of a daisy chain network 250a (for example) have been powered, initialized, and identified, one or more commands and/or messages may be sent to the safety device controllers 210e-g from one or more of the safety network controllers 100a, 100b. Such commands may include, for example, commands to obtain device status, actuate a safety device, and perform a self-check, among other things. In one particular example, a safety network controller 100a may be configured to command safety device controller 210f to check a direct connection it has to safety device controller 210g by measuring impedance over that connection.

In another example, after initialization and discovery of the safety device controllers 210, to check the speed of the network connection between safety network controllers 100a, 100b, either of the safety network controllers 100a, 100b may send a broadcast message over one or more of the daisy chain networks 250a, 250b between them. The procedure may also be repeated in the opposite direction.

Figure 9:
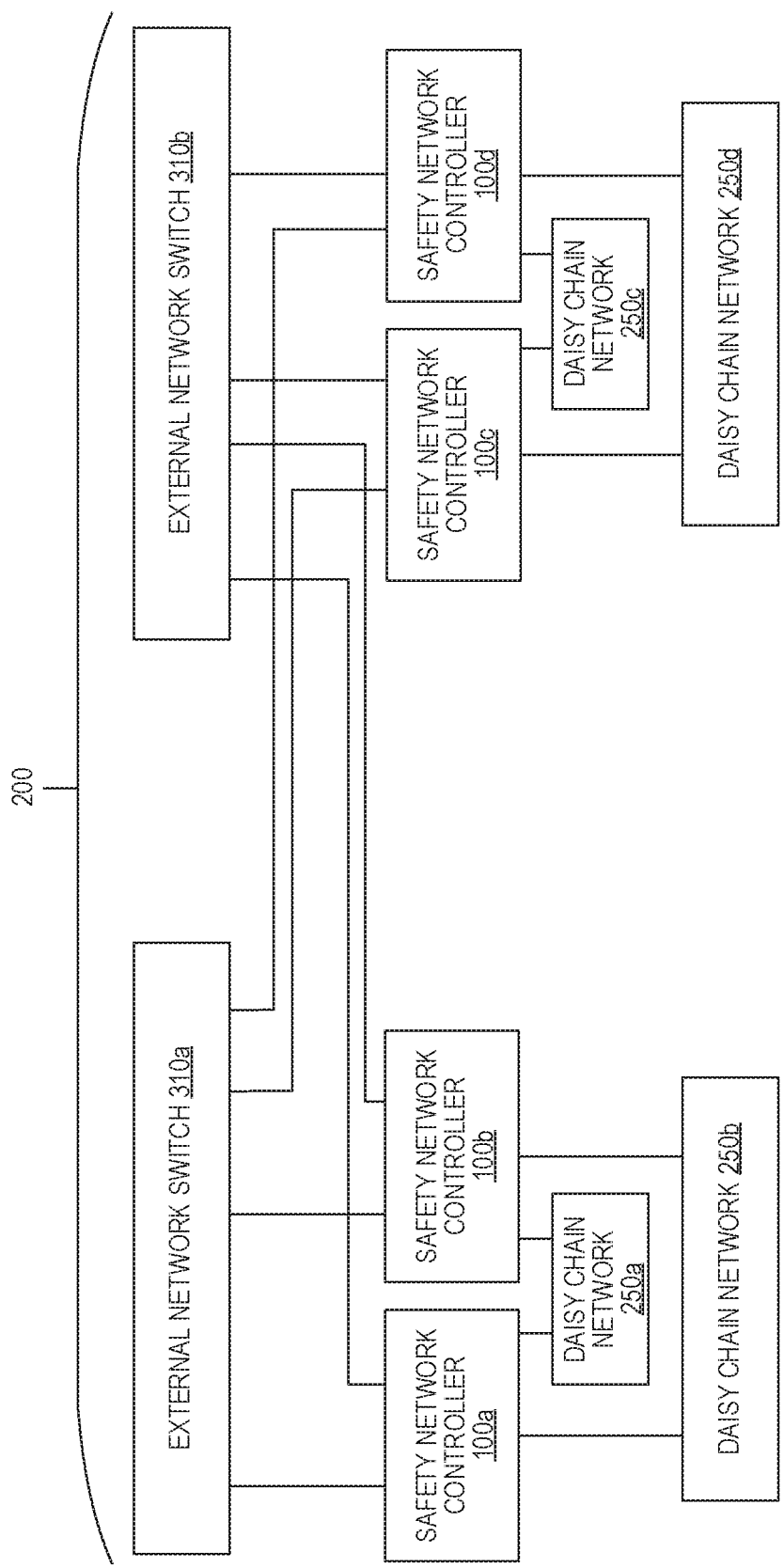
FIG. 9 is a schematic block diagram of another example electronic safety system, according to one or more embodiments of the present disclosure.

In some yet further embodiments of the electronic safety system 200, one or both of the safety network controllers 100a, 100b is communicatively connected to each of a pair of further safety network controllers 100c, 100d via at least two external network switches 310a, 310b, e.g., as depicted in the example schematic diagram of FIG. 9. In this example, the safety network controllers 100c, 100d are redundant to each other. According to such examples, safety network controllers 100c, 100d may initialize and discover the safety device controllers 210 of their daisy chain networks 250c, 250d in a substantially similar fashion as described above with respect to safety network controllers 100a, 100b. However, in any of the embodiments described above, any of the external network switches 310a-d may provide an alternative communication route for any communication with a safety device controller 210 and/or safety network controller 100, e.g., in response to one or more of the failures described above. Such failures may include one or more of the failures described with respect to FIGS. 6B-6F, for example.

Yet further examples of an electronic safety system 200 may include different numbers of safety network controllers 100 and/or safety device controllers 210 connected to any other by a daisy chain network 250 and/or packet-switched network 260, consistent with one or more of the embodiments described above. Indeed, the number of devices in the electronic safety system 200 is not inherently limited. For example, embodiments of the electronic safety system 200 may include 8000 or more output devices in many practical applications (e.g., in a large, multi-story office building). That said, the number of devices that are strung together on any given daisy chain network may be limited by practical considerations, e.g., communication delay between a given safety device controller 210 and the nearest safety network controller 100. Other limitations may be driven, e.g., by the number of network and/or serial ports available on any switch or device in the electronic safety system 200.

The present invention may be carried out in other ways than those specifically set forth herein without departing from essential characteristics of the invention. The present examples are to be considered in all respects as illustrative and not restrictive, and all changes coming within the meaning and equivalency range of the appended claims are intended to be embraced therein. Although steps of various processes or methods described herein may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention.

What is claimed is:

1. A safety network controller in an electronic safety system, the safety network controller comprising:
   a first serial port and a second serial port, each of which is configured to communicatively connect to a redundant safety network controller via a respective daisy chain network, each daisy chain network comprising at least one safety device controller that is configured to control a corresponding safety device;
   network circuitry configured to communicatively connect to the redundant safety network controller via a packet-switched network;
   processing circuitry communicatively connected to the network circuitry and each of the serial ports, wherein the processing circuitry is configured to exchange, with the redundant safety network controller:
      serial communication via each of the daisy chain networks;
      packets via the packet-switched network; and responsibility for control over one or more of the safety device controllers in response to detecting a failure.

2. The safety network controller of claim 1, wherein to connect to the redundant safety network controller via the packet-switched network, the network circuitry is configured to communicatively connect to the redundant safety network controller via a plurality of packet-switched paths having initial hops at respective external network switches.

3. The safety network controller of claim 2, wherein:
the network circuitry is further configured to communicatively connect to each of a pair of further safety network controllers via at least two of the external network switches;
the further safety network controllers are redundant to each other.

4. The safety network controller of claim 2, wherein the network circuitry comprises an internal network switch via which the network circuitry is configured to communicatively connect to the redundant safety network controller via the plurality of packet-switched paths.

5. The safety network controller of claim 2, wherein the processing circuitry is further configured to exchange status information with a remote safety administration terminal via at least two of the external network switches.

6. The safety network controller of claim 1, wherein to exchange responsibility for control over one or more of the safety device controllers in response to detecting the failure, the processing circuitry is configured to respond to detecting the failure in the redundant safety network controller by taking control over all of the safety device controllers on the daisy chain networks controlled by the redundant safety network controller.

7. The safety network controller of claim 1, wherein to exchange responsibility for control over one or more of the safety device controllers in response to detecting the failure, the processing circuitry is configured to respond to detecting the failure in the safety network controller by surrendering control over all of the safety device controllers on the daisy chain networks controlled by the safety network controller to the redundant safety network controller.

8. The safety network controller of claim 1, wherein to exchange responsibility for control over one or more of the safety device controllers in response to detecting the failure, the processing circuitry is configured to respond to detecting the failure in one of the daisy chain networks by surrendering control over a safety device controller at a point on the daisy chain network beyond the failure to the redundant safety network controller.

9. The safety network controller of claim 1, wherein to exchange responsibility for control over one or more of the safety device controllers in response to detecting the failure, the processing circuitry is configured to respond to detecting the failure in one of the daisy chain networks by taking control over a safety device controller at a point on the daisy chain network before the failure from the redundant safety network controller.

10. The safety network controller of claim 1, wherein:
the processing circuitry is further configured to discover each of the safety device controllers of each daisy chain network;
to discover each of the safety device controllers of each daisy chain network, the processing circuitry is configured to, for each daisy chain network, transmit identification requests on the daisy chain network until the processing circuitry fails to receive a corresponding response comprising a safety device identifier.

11. The safety network controller of claim 1, wherein the processing circuitry is further configured to divide responsibility for controlling the safety device controllers of each daisy chain network between the safety network controller and the redundant safety network controller such that each controls at least one safety device controller per daisy chain network.

12. The safety network controller of claim 1, wherein the first and second serial ports are further configured to relay power to respective safety devices on the respective daisy chain networks.

13. The safety network controller of claim 1, wherein the first and second serial ports are communicatively connected to each other and are configured to form, from at least the daisy chain networks, a ring network that includes the safety network controller, the redundant safety network controller, and the safety device controllers of each of the daisy chain networks.

14. The safety network controller of claim 1, further comprising one or more further serial ports each of which is configured to communicatively connect to, and exchange further serial communication over, a respective further daisy chain network comprising at least one further safety device controller that is controlling a corresponding further safety device.

15. The safety network controller of claim 1, wherein:
one of the daisy chain networks comprises a direct connection between a first safety device controller and a second safety device controller;
the processing circuitry is further configured to command the first safety device controller to check the direct connection by measuring impedance over the direction connection between the first and second safety device controllers.

16. A method of supporting control redundancy within an electronic safety system, implemented by a safety network controller, the method comprising:
exchanging serial communication with a redundant safety network controller via a first serial port and a second serial port, each serial port being communicatively connected to the redundant safety network controller via a respective daisy chain network, each daisy chain network comprising at least one safety device controller that is configured to control a corresponding safety device;
exchanging packets with the redundant safety network controller via a packet-switched network;
exchanging, with the redundant safety network controller, responsibility for control over one or more of the safety device controllers in response to detecting a failure.

17. The method of claim 16, wherein exchanging packets with the redundant safety network controller via the packet-switched network comprises exchanging the packets via a plurality of packet-switched paths having initial hops at respective external network switches.

18. The method of claim 17, further comprising exchanging further packets via the packet-switched network with each of a pair of further safety network controllers via at least two of the external network switches, wherein the further safety network controllers are redundant to each other.

19. The method of claim 17, wherein exchanging the packets via the plurality of packet-switched paths having initial hops at respective external network switches comprises exchanging the packets via an internal network switch of the safety network controller.

20. The method of claim 17, further comprising exchanging status information with a remote safety administration terminal via at least two of the external network switches.

21. The method of claim 16, wherein exchanging, with the redundant safety network controller, responsibility for control over one or more of the safety device controllers in response to detecting the failure comprises responding to detecting the failure in the redundant safety network controller by taking control over all of the safety device controllers on the daisy chain networks controlled by the redundant safety network controller.

22. The method of claim 16, wherein exchanging, with the redundant safety network controller, responsibility for control over one or more of the safety device controllers in response to detecting the failure comprises responding to detecting the failure in the safety network controller by surrendering control over all of the safety device controllers on the daisy chain networks controlled by the safety network controller to the redundant safety network controller.

23. The method of claim 16, wherein exchanging, with the redundant safety network controller, responsibility for control over one or more of the safety device controllers in response to detecting the failure comprises responding to detecting the failure in one of the daisy chain networks by surrendering control over a safety device controller at a point on the daisy chain network beyond the failure to the redundant safety network controller.

24. The method of claim 16, wherein exchanging, with the redundant safety network controller, responsibility for control over one or more of the safety device controllers in response to detecting the failure comprises responding to detecting the failure in one of the daisy chain networks by taking control over a safety device controller at a point on the daisy chain network before the failure from the redundant safety network controller.

25. The method of claim 16, further comprising discovering each of the safety device controllers of each daisy chain network, the discovering comprising, for each daisy chain network, transmitting identification requests on the daisy chain network until failing to receive a corresponding response comprising a safety device identifier.

26. The method of claim 16, further comprising dividing responsibility for controlling the safety device controllers of each daisy chain network between the safety network controller and the redundant safety network controller such that each controls at least one safety device controller per daisy chain network.

27. The method of claim 16, further comprising relaying power to respective safety devices on the respective daisy chain networks via the first and second serial ports.

28. The method of claim 16, bridging the first and second serial ports to form, from at least the daisy chain networks, a ring bus that includes the safety network controller, the redundant safety network controller, and the safety device controllers of each of the daisy chain networks.

29. The method of claim 16, further comprising exchanging further serial communication with at least one further safety device controller that is controlling a corresponding further safety device via one or more further serial ports connected to respective further daisy chain networks.

30. The method of claim 16, wherein one of the daisy chain networks comprises a direct connection between a first safety device controller and a second safety device controller, and the method further comprises commanding the first safety device controller to check the direct connection by measuring impedance over the direction connection between the first and second safety device controllers.

* * * * *